J. PANNABECKER.
Making Gun Barrels.

No. 7,547.

Patented Aug. 6, 1850.

UNITED STATES PATENT OFFICE.

JESSE PANNABECKER, OF ELIZABETH TOWNSHIP, PENNSYLVANIA.

IMPROVED METHOD OF MAKING BARRELS FOR FIRE-ARMS.

Specification forming part of Letters Patent No. 7,547, dated August 6, 1850.

*To all whom it may concern:*

Be it known that I, JESSE PANNABECKER, of Elizabeth township, in the county of Lancaster and State of Pennsylvania, have invented a new and Improved Rifle and Gun Barrel with Two Seams; and I do hereby declare that the following is a full and exact description thereof, reference being had to the accompanying drawings, and to the letters of reference marked thereon, making a part of this specification.

Figure 1:
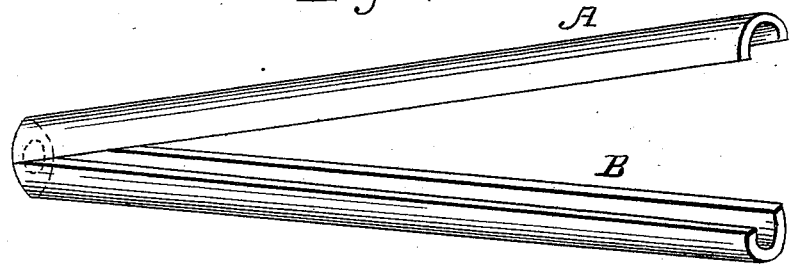
Figure 2:

Figure 1 represents the iron semicircle, bent in the center and representing two pieces with smooth edges, being doubled together to form the complete circle inside and outside. Fig. 2 represents the rifle or gun barrel with two seams ready for welding.

To enable others skilled in the art to make and use my invention, I will proceed to describe its construction.

I manufacture rifle and gun barrels of every description with two seams by having the iron formed in a semicircle or groove with smooth edges, so that when two pieces are doubled together a perfect circle is formed inside and outside, and rifle or gun barrels are more easily and cheaper manufactured, and thus I make rifle-barrels with two seams that when welded together the circular barrel is perfectly formed and is as perfect as with one seam, and by which the great labor and trouble as heretofore in turning the flat bar up to form one seam is avoided and saved, and the iron is formed and manufactured in a semicircle without any more labor or trouble and as easily made as a flat bar, and at the same price.

A represents the one semicircle or half rifle-barrel with smooth edges; B, the other semicircle or opposite half-barrel with corresponding smooth edges; C, the conjoined semicircles forming the rifle-barrel with close seams ready for welding, and making the complete circle inside and outside, thus requiring much less labor to finish than as heretofore.

What I claim as my invention, and desire to secure by Letters Patent, is—

Making barrels for fire-arms with a double seam or weld from two bars of metal previously rolled into a semi-cylindrical form, the whole operation being conducted as herein described.

JESSE PANNABECKER.

Witnesses:
P. DONNELLY,
WM. T. AMWEG.